United States Patent
Fujii et al.

(10) Patent No.: US 10,218,096 B2
(45) Date of Patent: Feb. 26, 2019

(54) SHORT BAR, SHORT BAR UNIT, AND MOTOR DRIVE DEVICE

(71) Applicant: Fanuc Corporation, Yamanashi (JP)

(72) Inventors: Shouta Fujii, Yamanashi (JP); Kaname Matsumoto, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/830,146

(22) Filed: Dec. 4, 2017

(65) Prior Publication Data
US 2018/0166800 A1   Jun. 14, 2018

(30) Foreign Application Priority Data

Dec. 9, 2016  (JP) ................................ 2016-239766

(51) Int. Cl.
| | | |
|---|---|---|
| H01R 24/00 | (2011.01) | |
| H01R 9/24 | (2006.01) | |
| H01R 9/18 | (2006.01) | |
| H02P 3/18 | (2006.01) | |

(52) U.S. Cl.
CPC ............. H01R 9/2408 (2013.01); H01R 9/18 (2013.01); H02P 3/18 (2013.01)

(58) Field of Classification Search
CPC ............ H01R 9/2408; H01R 9/18; H02P 3/18
See application file for complete search history.

(56) References Cited

U.S. PATENT DOCUMENTS 3,494,852 A * 2/1970 Doctoroff ............. C23C 14/325
204/192.38

2003/0236022 A1* 12/2003 Nakamura ............. H01R 43/20
439/488
2009/0230898 A1   9/2009 Matsubara et al.
2010/0255730 A1  10/2010 Masuda et al.
2015/0229246 A1   8/2015 Matsumoto

FOREIGN PATENT DOCUMENTS

| JP | 2539773 Y2 | 6/1997 |
|---|---|---|
| JP | 2007-159213 A | 6/2007 |
| JP | 2009-225497 A | 10/2009 |
| JP | 2010-244891 A | 10/2010 |
| JP | 2015-154566 A | 8/2015 |
| JP | 2016-073188 A | 5/2016 |

OTHER PUBLICATIONS

Japan Patent Office, Decision to Grant a Patent dated Apr. 10, 2018 for Japan Patent Application No. 2016-239766.

* cited by examiner

Primary Examiner — Jean F Duverne
(74) Attorney, Agent, or Firm — Winstead PC

(57) ABSTRACT

A short bar for connecting terminal blocks of two motor driving units which drive a motor includes a strip-plate-like fixed portion which has a through hole into which a screw for fixing is inserted and which is fixed to the terminal block of the motor driving unit with the screw, a first connection portion which is provided on one end of the fixed portion, and a second connection portion which is provided on the other end of the fixed portion, wherein the first connection member has a configuration that the first connection portion and the second connection portion of another shot bar can be connected electrically and mechanically with each other through a relative movement in the thickness direction of the fixing member.

6 Claims, 11 Drawing Sheets

SHORT BAR, SHORT BAR UNIT, AND MOTOR DRIVE DEVICE

CROSS-REFERENCE TO RELATED APPLICATIONS

This application is based on and claims priority to Japanese Patent Application No. 2016-239766 filed on Dec. 9, 2016, the entire content of which is incorporated herein by reference.

TECHNICAL FIELD

The present invention relates to a short bar, a short bar unit, and a motor drive device.

BACKGROUND ART

As illustrated in FIGS. 14(a) and 14(b), a known motor drive device (refer to PTL 1, for example) includes a first motor driving unit 110 that functions as a converter, and a second motor driving unit 120 that functions as an inverter. The first motor driving unit 110 and the second motor driving unit 120 are connected with each other through a pair of short bars 130.

With the motor drive device 100 described in PTL 1, the second motor driving unit 120 is replaced depending on a specification of a driving motor, and the like. At the time of replacement, the second motor driving unit 120 is moved toward a front side relative to the first motor driving unit 110, and another second motor driving unit 120 is inserted to the back side from the front side relative to the first motor driving unit 110.

CITATION LIST

Patent Literature

{PTL 1}
Japanese Unexamined Patent Application, Publication No. 2009-225497

SUMMARY OF INVENTION

An aspect of the present invention provides a short bar for connecting terminal blocks of two motor driving units which drive a motor, the shot bar comprising: a strip-plate-like fixed portion which has a through hole into which a screw for fixing is inserted and which is fixed to the terminal block of the motor driving unit with the screw; a first connection portion which is provided on an end of the fixed portion; and a second connection portion which is provided on the other end of the fixed portion, wherein the first connection portion has a configuration that the first connection portion and the second connection portion of another short bar can be connected electrically and mechanically with each other through a relative movement in a thickness direction of the fixed portion.

Further, another aspect of the present invention provides a short bar unit for connecting terminal blocks of two motor driving units which drive a motor, the shot bar unit comprising: a first short bar fixed to the terminal block of one of the motor driving units; and a second short bar fixed to the terminal block of the other motor driving units, wherein the first short bar and the second short bar respectively include a strip-plate-like fixed portion which has a through-hole into which a screw for fixing is inserted in a thickness direction and which is fixed to the terminal block by the screw, the first short bar includes a first connection portion which is provided on at least one end of the fixed portion, the second short bar includes a second connection portion which is provided on at least one end of the fixed portion, and which has a configuration that the second connection portion can be connected with the first connection portion electrically and mechanically through a relative movement in the thickness direction of the fixed portion relative to the first connection portion.

DESCRIPTION OF EMBODIMENTS

A short bar 4 and a motor drive device 1 according to an embodiment of the present invention will be described below with reference to the accompanying drawings.

Figure 2:
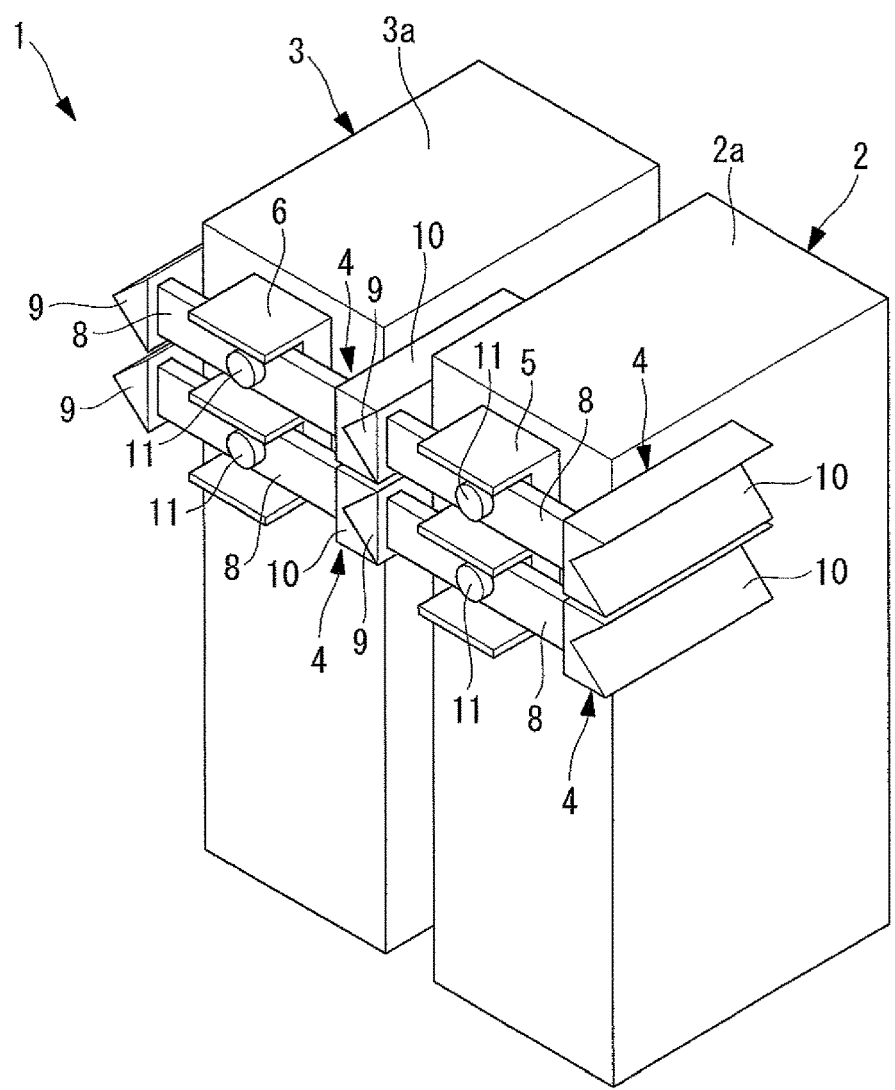
FIG. 2 is a perspective view illustrating a motor drive device according to the embodiment of the present invention.
Figure 3:
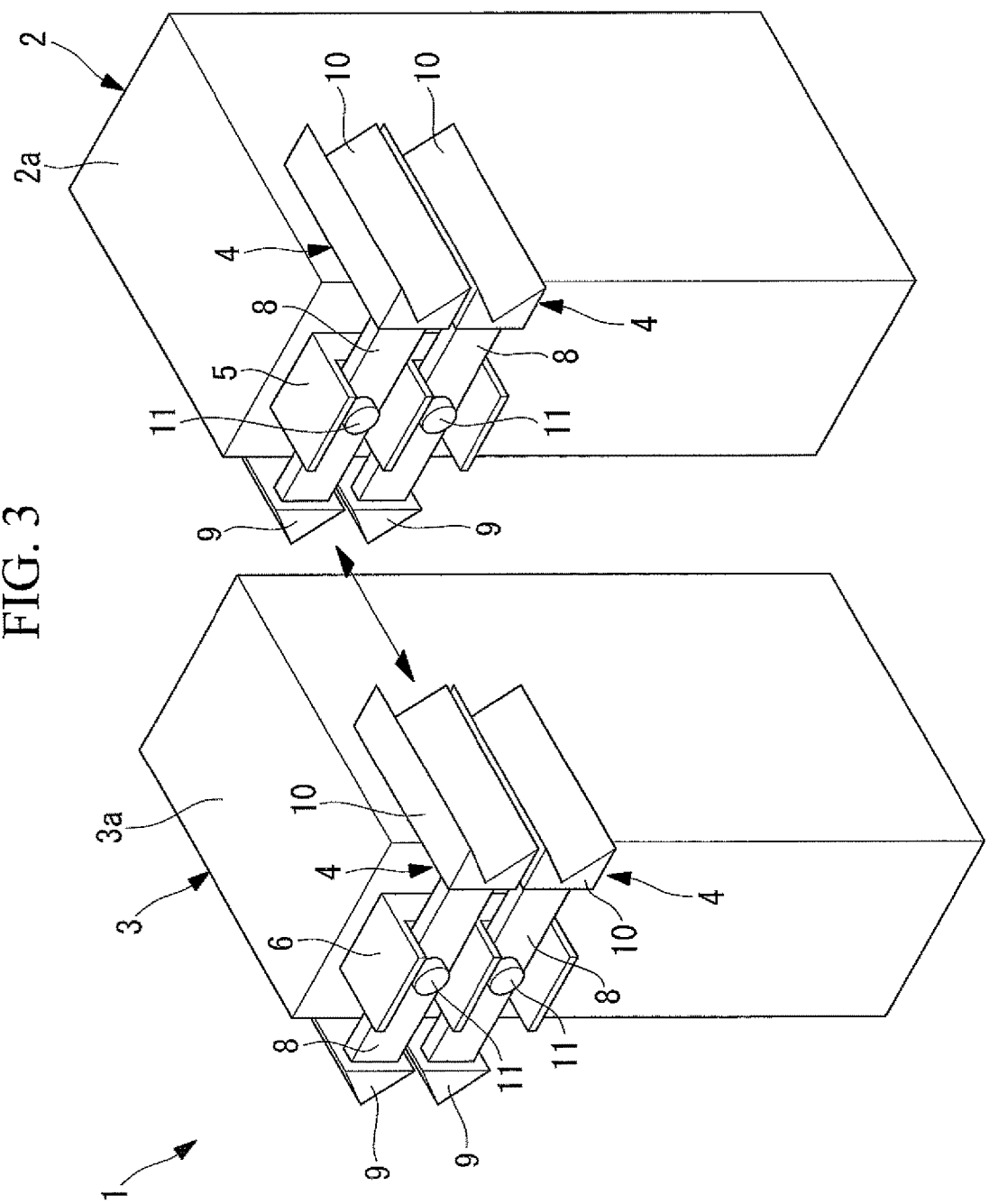
FIG. 3 is a perspective view illustrating a state where an inverter is moved toward a front side relative to a converter of the motor drive device of FIG. 2.

As shown in FIGS. 2 and 3, the motor drive device 1 according to the present embodiment includes a converter (a first motor driving unit) 2 configured to convert alternating-current power supplied from a power source (not shown) into direct-current power, at least one inverter (a second motor driving unit) 3 configured to convert the direct-current power supplied from the converter 2 into alternating-current power and supply the alternating-current power to a motor of a robot, a machining tool, an industrial machine, and the like, and a short bar 4 according to the embodiment of the present invention for connecting the converter 2 and the inverter 3.

The convector 2 has a direct-current conversion circuit housed in a rectangular housing 2a and configured to convert alternating-current power into direct-current power. The converter 2 is provided with an exposed terminal block 5 having two terminals which are arranged vertically, and the terminal block 5 is provided on a surface of the rectangular housing 2a, such as the front surface.

The inverter 3 has an alternating-current conversion circuit housed in a rectangular housing 3a and configured to convert the direct-current power into alternating-current power. The inverter 3 is provided with a terminal block 6 which has two terminals arranged vertically, and the terminal block 6 is provided on a surface of the rectangular housing 3a, such as the front surface.

The converter 2 and the inverter 3 are arranged so that each of their front surfaces faces the same direction with a space therebetween, the converter 2 and the inverter 3 are moved in the front-and-rear direction as shown by an arrow in FIG. 3, and the converter 2 and the inverter 3 are fixed in a state where they are installed in a installation portion, which is not shown, of the motor drive device 1. For convenience of explanation, FIGS. 2 and 3 show a case where only one inverter 3 is provided.

As shown in FIG. 2, the converter 2 and the inverter 3 are arranged with a predetermined space between them in a state where the converter 2 and the inverter 3 are installed in the installation portion so that the front surfaces of the converter 2 and the inverter 3 are aligned in the same plane surface, and the converter 2 and the inverter 3 are placed at positions where the heights of the terminals thereof are aligned with each other.

Figure 1:
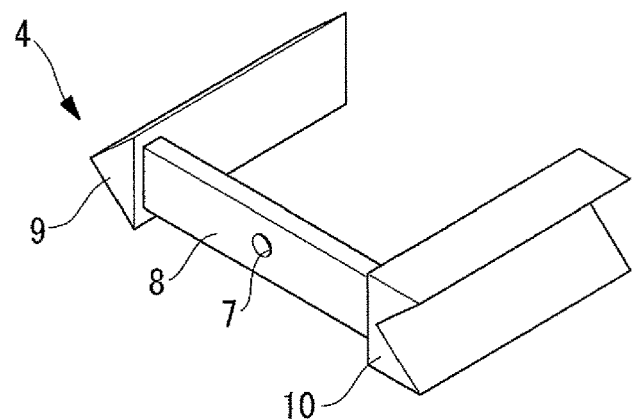
FIG. 1 is a perspective view illustrating a short bar according to an embodiment of the present invention.

The short bar 4 according to the present embodiment has, as shown in FIG. 1, a strip-plate-like fixed portion 8 having a through hole 7 which penetrates the fixed portion 8 in the thickness direction thereof at the center of the fixed portion 8, a first connection portion 9 and a second connection portion 10 which are provided in both ends of the fixed portion 8 in the longitudinal direction. The fixed portion 8 is slightly longer than a dimension of the front surface of each of the housings 2a, 3a of the converter 2 and the inverter 3. Also, the short bars 4 can be attached to the terminals of the terminal blocks 5, 6 of the converter 2 and the inverter 3 by inserting the screws 11 into the through holes 7.

As shown in FIG. 1, the first connection portion 9 is formed in a triangular pillar shape fixed to an end of the fixed portion 8 so that its longitudinal axis extends in the thickness direction of the fixed portion 8. The fixed portion 8 is fixed to a side surface of the first connection portion 9. By this, the first connection portion 9 is placed so that a ridge line along the longitudinal axis of the first connection portion 9 faces outward in the longitudinal direction of the fixed portion 8.

The second connection portion 10 is formed in a quadrangular pillar shape fixed to the other end of the fixed portion 8 so that a longitudinal axis thereof also extends in the thickness direction of the fixed portion 8. The second connection portion 10 is provided with a V-shaped groove having a shape complemental to the lateral-cross-section shape of the first connection portion 9 along the longitudinal direction. The fixed portion 8 is fixed to a side surface opposite to the V-shaped groove of the second connection portion 10. By this, the V-shaped groove is placed so as to face outward in the longitudinal direction of the fixed portion 8.

Functions of such configured short bars 4 and the motor drive device 1 according to the present embodiment will be described below.

With the motor drive device 1 according to the present embodiment, the short bars 4 are attached to the terminals of the terminal blocks 5, 6 of the converter 2 and the inverter 3 configuring this motor drive device 1 through a screw 11 so that all of the short bars 4 are oriented in the same direction.

With this state, the converter 2 is fixed to the installation portion of the motor drive device 1 at first, and then the inverter 3 is installed in the installation portion by sliding the inverter 3 from the front surface side of the converter 2 to the rear side thereof relative to the converter 2 as shown by an arrow in FIG. 3.

In this case, the inverter 3 is placed at a position where the first connection portions 9 of the short bars 4, which are attached to the converter 2, respectively fit in the V-shaped grooves of the second connection portions 10 of the short bars 4 which are attached to the inverter 3.

And, the first connection portions 9 and the second connection portions 10 extend toward the front-and-rear direction of the converter 2, that is to say, the thickness direction of the fixed portion 8 of the short bar 4.

Accordingly, the first connection portions 9 of the short bars 4, which are attached to the converter 2, come into contact with the second connection portions 10 of the short bars 4 which are attached to the inverter 3, and a contact area thereof becomes larger by sliding the inverter 3 in the front-and-rear direction relative to the converter 2. Also, as shown in FIG. 2, when the inverter 3 is installed completely, the inverter 3 is placed at a position where the first connection portions 9 of the short bars 4 and the second connection portions 10 of the inverter 3 come into close contact with each other so as to fit completely, and both of them are electrically and mechanically connected with each other.

As described above, with the short bar 4 and the motor drive device 1 according to the present embodiment, the short bars 4 are fixed to the converter 2 and the inverter 3, and thereby the motor drive device 1 can be assembled only by a relative movement in the front-and-rear direction of the converter 2 and the inverter 3. Further, when replacing the converter 2 or the inverter 3, the first connection portions 9 and the second connection portions 10 of the short bars 4, which are connected, can easily be detached only by a relative movement of the converter 2 and the inverter 3 in the front-and-rear direction.

Figure 14A:
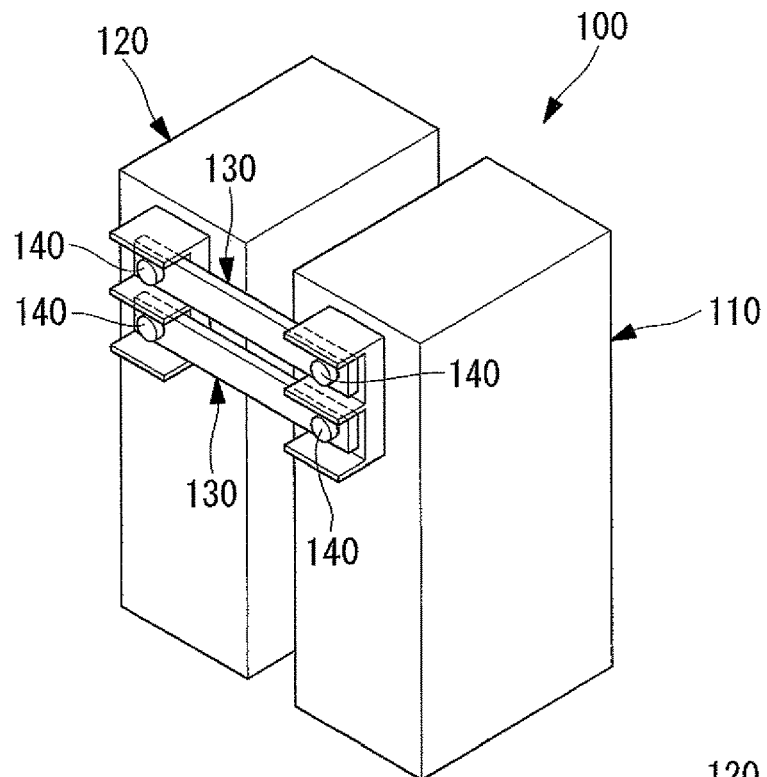
FIG. 14A is a perspective view illustrating an assembled state of a conventional motor drive unit.
Figure 14B:
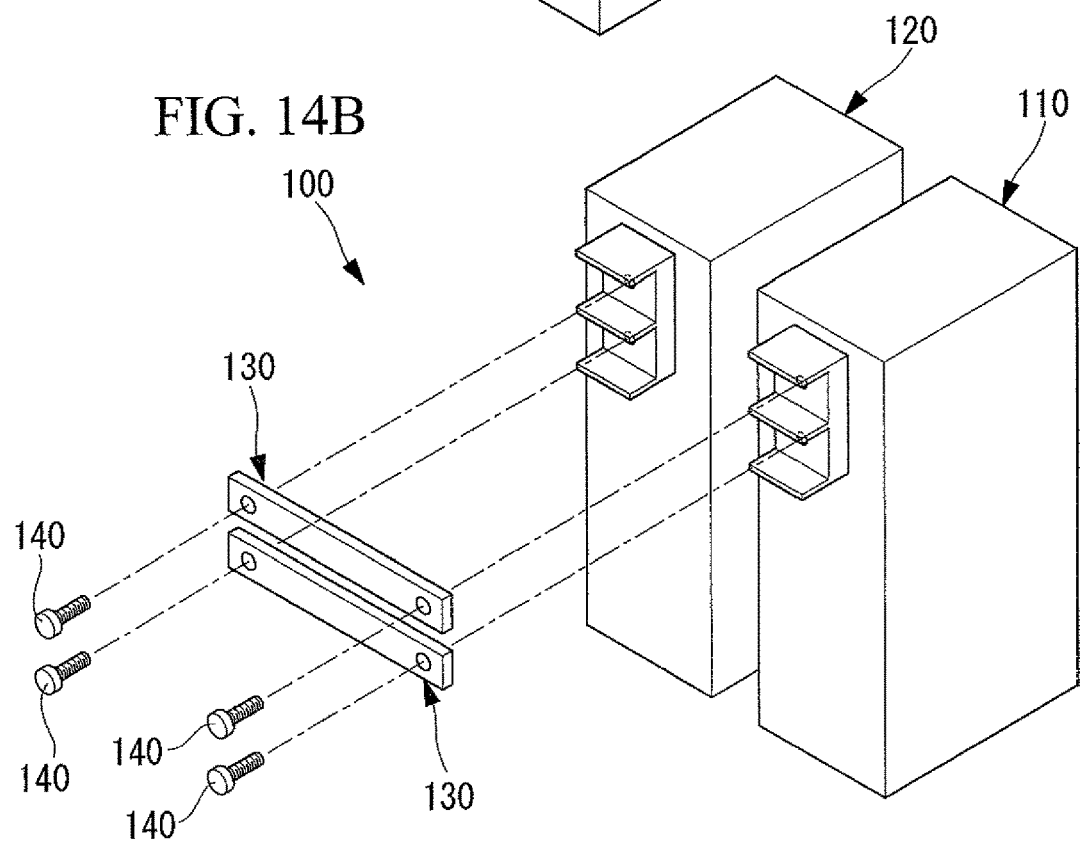
FIG. 14B is a perspective view illustrating a case where an inverter is being removed from the conventional motor drive unit.

Thus, at the time of replacing the inverter 120, it is not necessary to completely remove the short bars 130 not only from the inverter 120 but also from the converter 110 by removing the screws 140 like a conventional motor drive device 100 as illustrated in FIGS. 14(a) and 14(b). It is advantageous for replacing the inverter 120 easily in a short time.

Also, in the present embodiment, the converter 2 is installed in the motor drive device 1 at first, then the inverter 3 is installed in the motor drive device 1 by sliding the inverter 3 in the front-and-rear direction. In another configuration, the inverter 3 may be installed in the motor derive device 1 first, and then the converter 2 may be installed in the motor drive device 1 by sliding the converter 2 in the front-and-rear direction.

Also, in the present embodiment, the first connection portions 9 of the short bars 4, which are attached to the converter 2, are connected to the second connection portions 10 of the short bars 4 which are attached to the inverter 3. In another configuration, the second connection portions 10 of the short bars 4, which are attached to the converter 2 may be connected with the first connection portions 9 of the short bars 4 which are attached to the inverter 3.

In addition, with the short bars 4 and the motor drive device 1 according to the present embodiment, since all of the short bars 4 have the first connection portion 9 and the second connection portion 10 at the both ends of the fixed portion 8, it is possible to easily connect more than two inverters 3 with the same converter 2. In another configuration, when connecting the single inverter 3 to the converter 2, only one of the first connection portion 9 or the second connection portion 10 may be provided in an end or the both ends of the fixed portion 8 of the short bar 4.

Thus, the short bar 4 provided with the first connection portion 9 can be attached to the converter 2, and the short bar 4 provided with the second connection portion 10 can be attached to the inverter 3. Alternatively, the short bar 4 provided with the second connection portion 10 may be attached to the converter 2, and the short bar 4 provided with the first connection portion 9 may be attached to the inverter 3.

Figure 4:
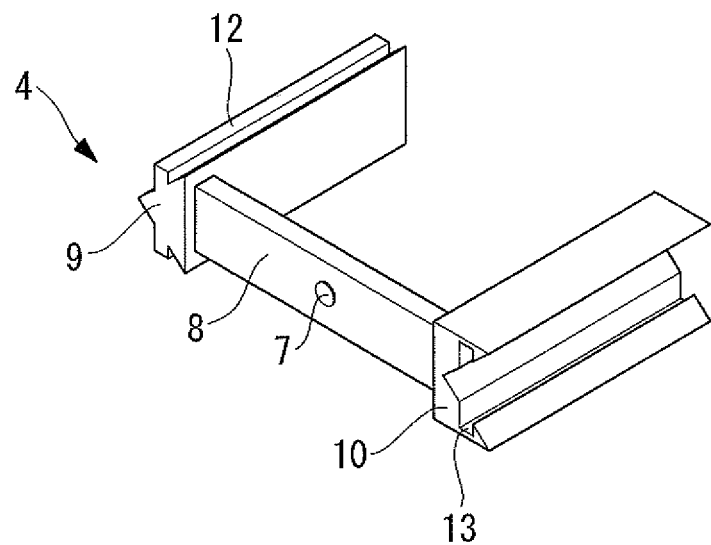
FIG. 4 is a perspective view illustrating a modified example of the short bar of FIG. 1.

Moreover, the first connection portion 9 is illustrated as a simple triangular pillar shape, and the second connection portion 10 is illustrated as a simple quadrangular pillar shape having a V-shaped groove. In another configuration, as shown in FIG. 4, an elongated protrusion 12 extending in the longitudinal direction of the triangular pillar may be provided in an inclined surface of the first connection portion 9, and a groove 13 extending in the longitudinal direction of the V-shaped groove may be provided in an inclined surface of the second connection portion 10. In this case, the lateral-cross-section shape of the first connection portion 9 and that of the second connection portion 10 also have shapes complemental with each other.

With this configuration, it is possible to further improve the close-contacting of the first connection portion 9 and the second connection portion 10, and achieve much better electrical connection thereof. Also, a configuration that the contacting surfaces of the elongated protrusion 12 and the groove 13 press against with each other by springy force may be employed in the contacting surfaces of the elongated protrusion 12 and the groove 13.

The groove 13 may be provided in an inclined surface of the first connection portion 9, and the elongated protrusion 12 may be provided in an inclined surface of the second connection portion 10.

Figure 5:
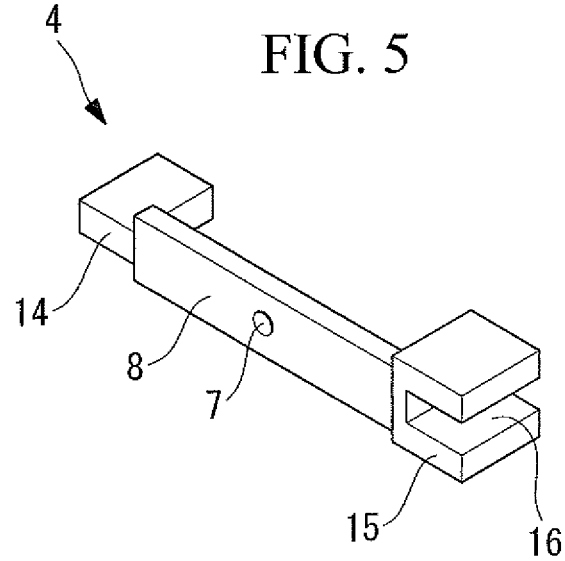
FIG. 5 is a perspective view illustrating another modified example of the short bar of FIG. 1.

Further, In the present embodiment, the triangular pillar shape is employed in the first connection portion 9, and the quadrangular pillar shape having the V-shaped groove is employed in the second connection portion 10. In another configuration, as illustrated in FIG. 5, a plate-like first connection portion 14 which extends in the thickness direction of the fixed portion 8, and a second connection portion 15 with a groove 16 having a lateral-cross-section shape complementary to the lateral-cross-section shape of the first connecting portion 14 may be employed.

Figure 6:
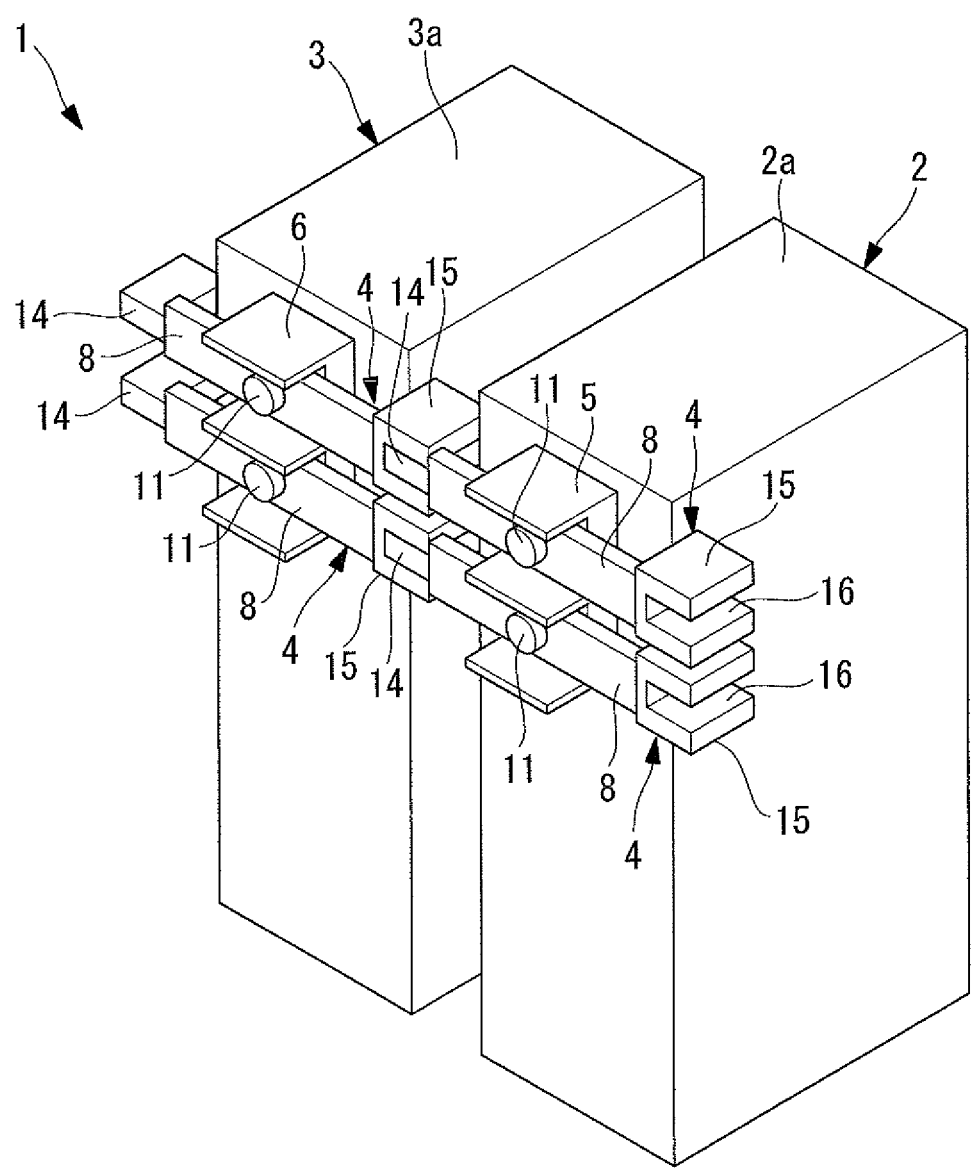
FIG. 6 is a perspective view illustrating a motor drive device having the short bar of FIG. 5.
Figure 7:
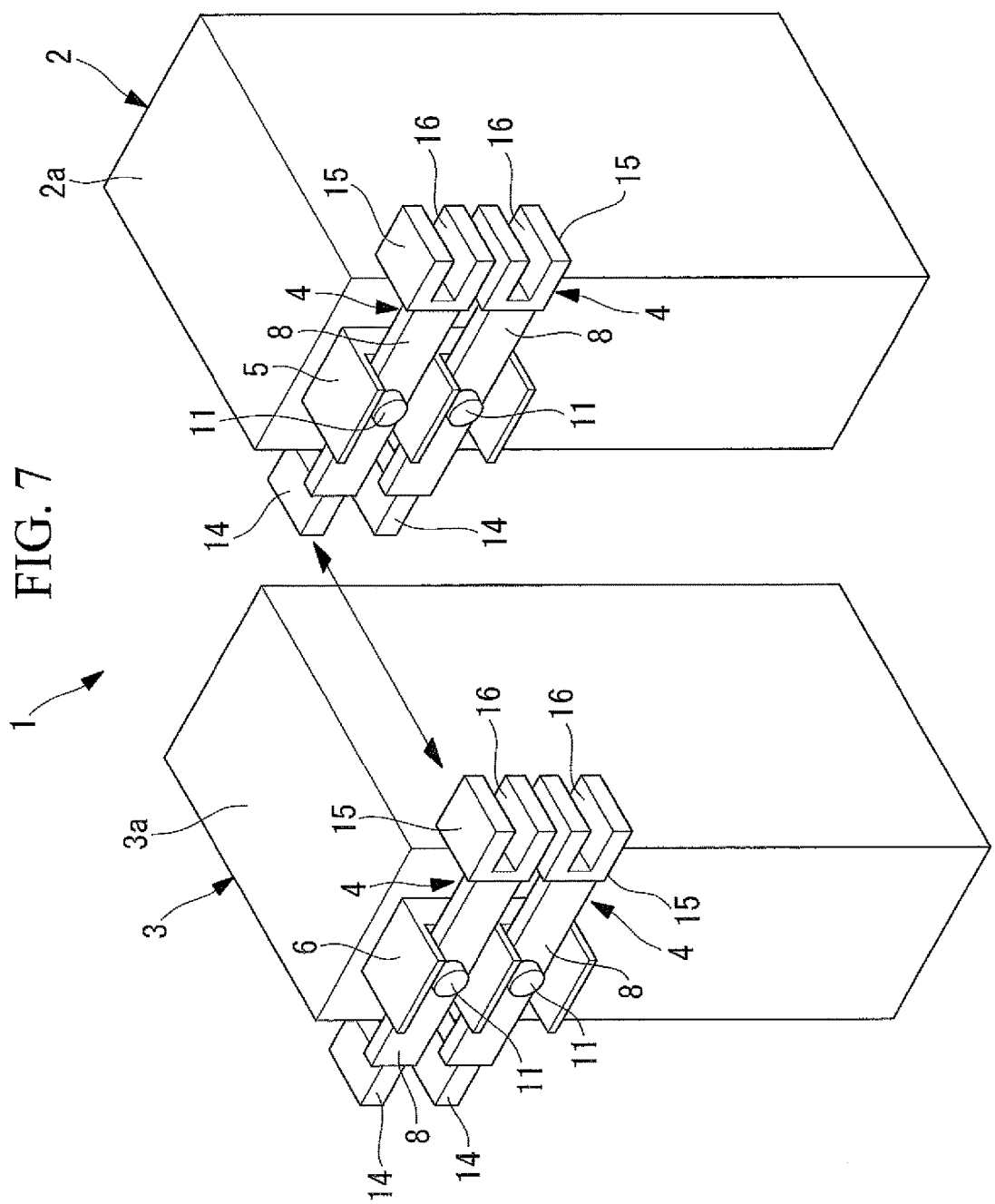
FIG. 7 is a perspective view illustrating a state where an inverter is moved toward a front side relative to a converter of the motor drive device of FIG. 6.

The above-mentioned configuration also allows the easy connection and removal of the first connection portion 14 and the second connection portion 15 by simply sliding either one of the converter 2 or the inverter 3 in the front-and-rear direction relative to the other, as shown in FIGS. 6 and 7.

Figure 8:
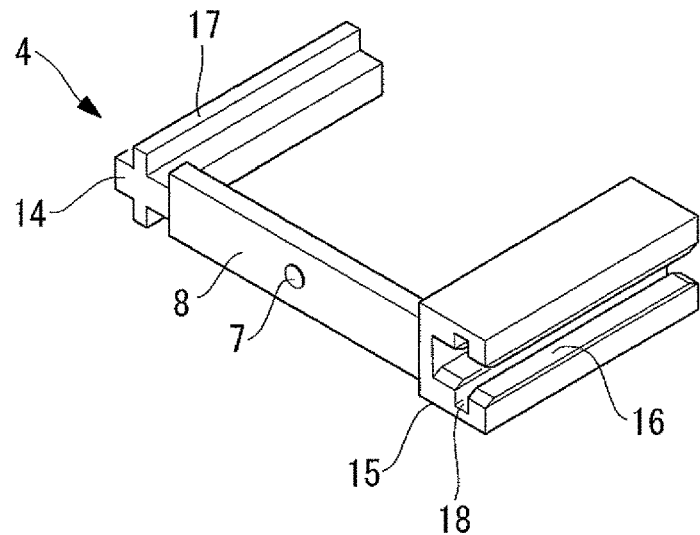
FIG. 8 is a perspective view illustrating a modified example of the short bar of FIG. 5.

In such case, as shown in FIG. 8, an elongated protrusion 17 may be provided in the first connection portion 14, and a groove 18 may be provided in the second connection portion 15, or a configuration that the contacting surfaces of the elongated protrusion 17 and the groove 18 press against each other by springy force may be employed so as to further improve the close-contacting state of the first connection portion 14 and the second connection portion 15, and achieve a much better electric connection state.

Moreover, the first connection portion 9 in the triangular pillar shape or the plate-like shape is illustrated, however, it is not limited thereto. A pillar shape having a predetermined lateral-cross-section shape, such as a first connection portion 9 in a columnar shape, a polygonal shape, or a tubular shape may be employed, and a second connection portion 10 having a groove with a lateral-cross-section shape complementary to the first connection portion 9 may be employed.

Next, a short bar unit 20 according to the present embodiment will be described below with reference to the accompanying drawings.

Figure 9A:
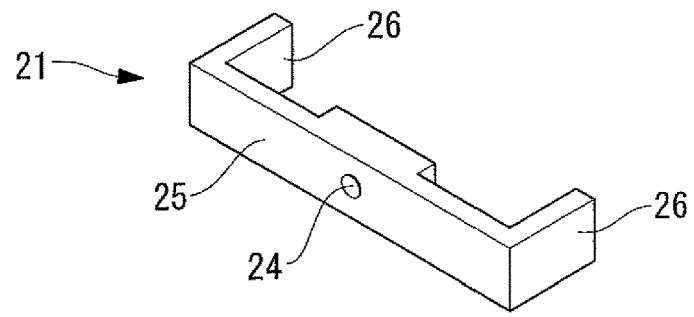
FIG. 9A is a perspective view illustrating a first short bar of a short bar unit according to the embodiment of the present invention.
Figure 9B:
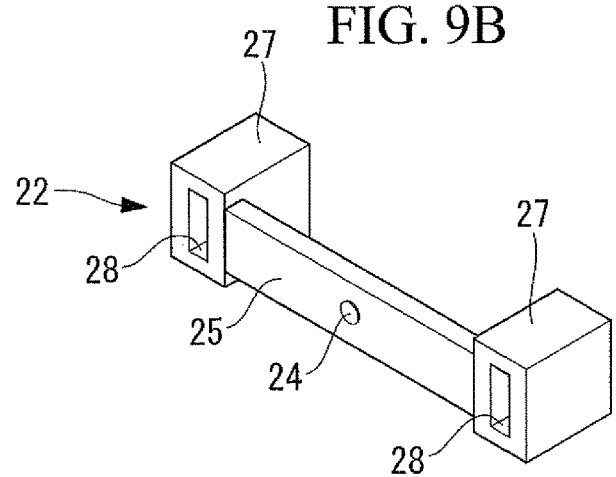
FIG. 9B is a perspective view illustrating a second shot bar of the short bar unit according to the embodiment of the present invention.
Figure 10:
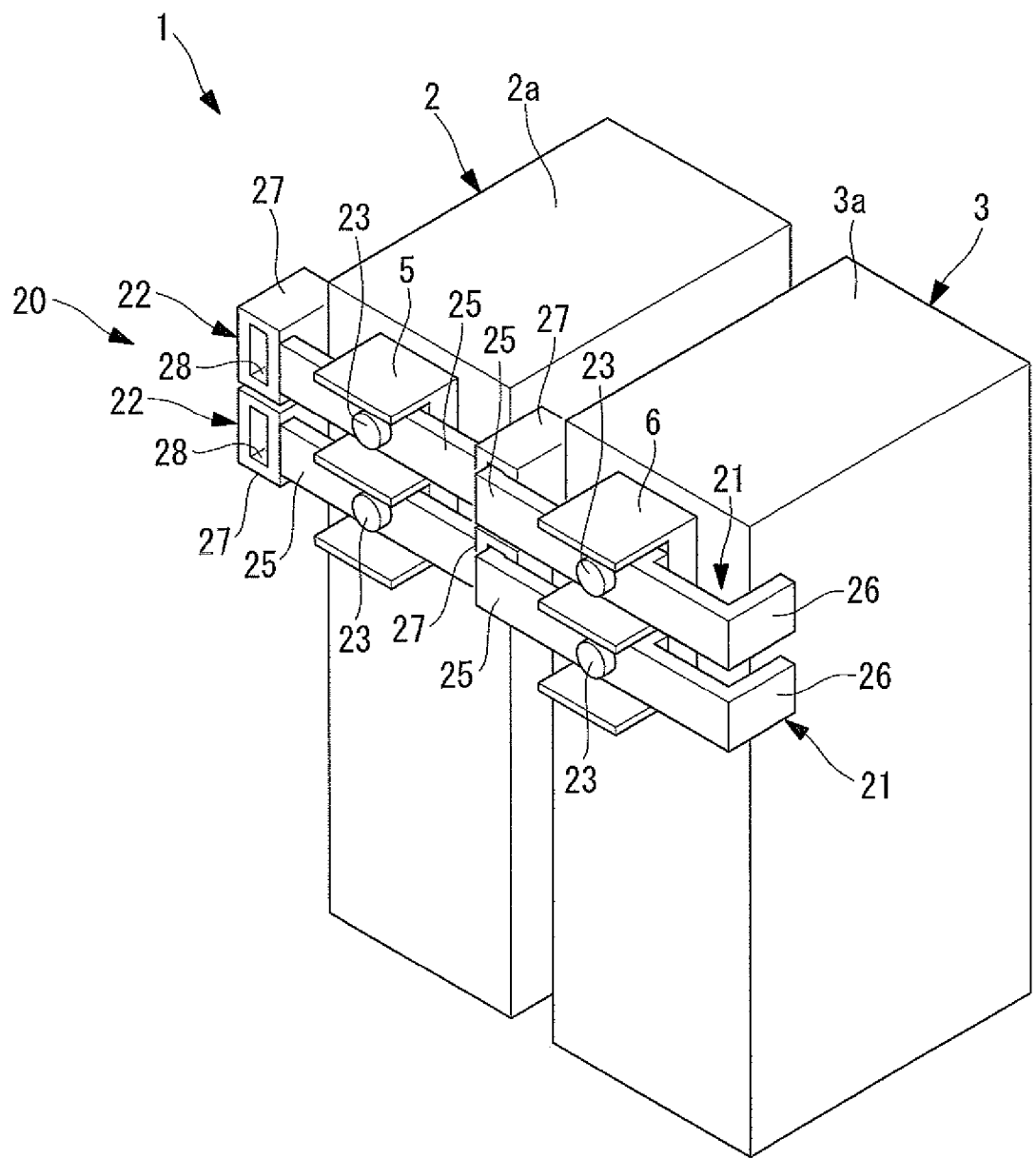
FIG. 10 is a perspective view illustrating a motor drive device having the short bar unit of FIG. 9.
Figure 11:
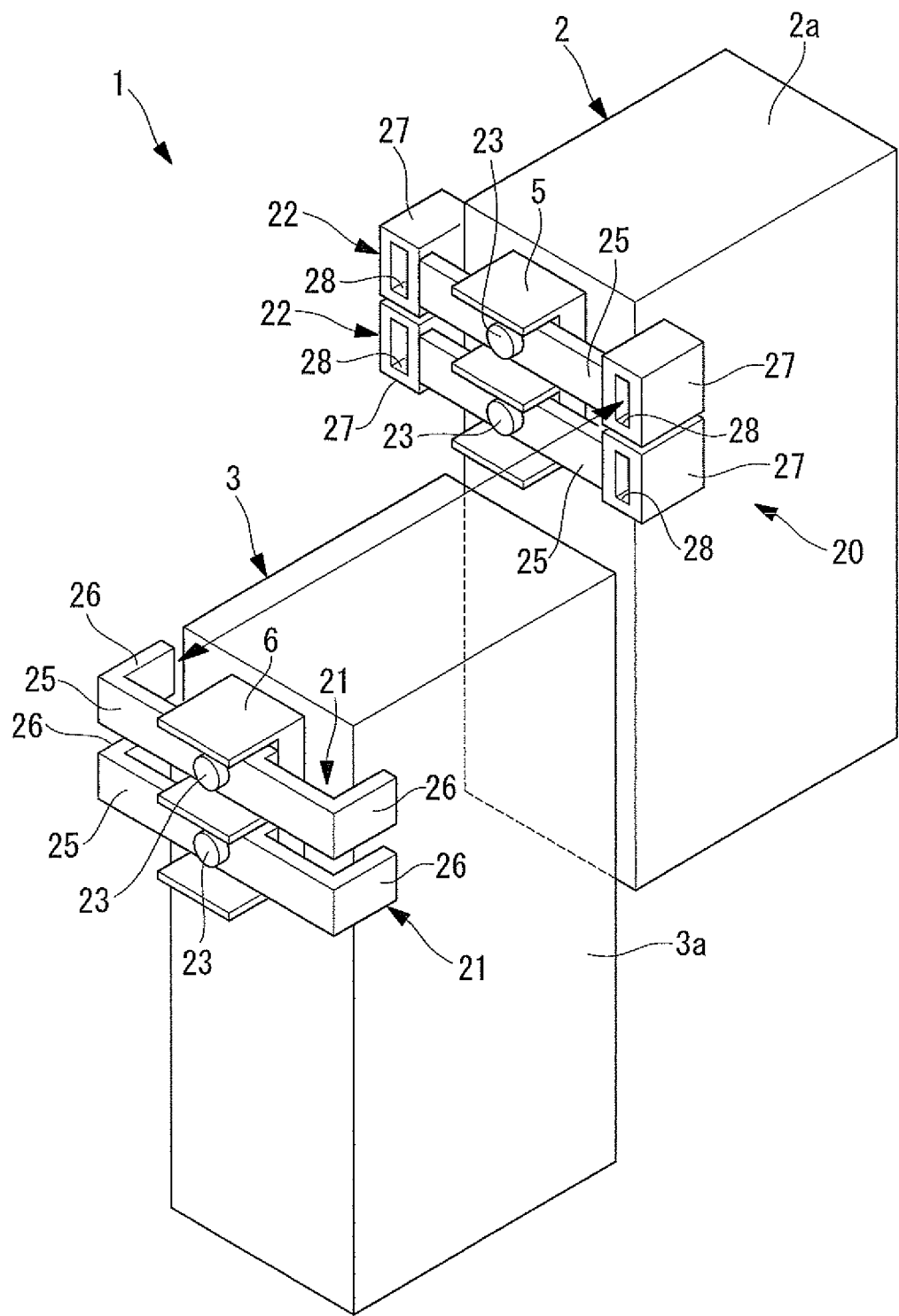
FIG. 11 is a perspective view illustrating a state where the inverter is moved toward a front side relative to the converter of the motor drive device of FIG. 10.

The short bar unit 20 according to the present embodiment has a first short bar 21 which is fixed to one of the terminal blocks 5, 6 of the converter 2 or the inverter 3, and a second short bar 22 which is fixed to the other of the terminal blocks 5, 6, as shown in FIGS. 9(a) to 13. In FIGS. 10 and 11, a case where the second short bar 22 is attached to the converter 2, and the first short bar 21 is attached to the inverter 3 is explained as an example.

The first short bar 21 and the second short bar 22 have a strip-plate-like fixed portion 25 with a through hole 24 through which a screw 23 for fixing penetrates in the thickness direction.

The first short bar 21 has a first connection portions 26 at the both ends of the fixed portion 25, as shown in FIG. 9(a).

The second short bar 22 has a second connection portions 27 at the both ends of the fixed portion 25, as shown in FIG. 9(b).

The both ends of the fixed portion 25 are bent at a right-angle so that plug portions extending in the thickness direction of the fixed portion 25 are formed.

The second connection portion 27 includes socket portions having mating holes 28 extending in the thickness direction of the fixed portion 25 at the both ends of the fixed portion 25. The mating holes 28 of the socket portions have a structure that can electrically and mechanically connect the first connection portion 26 and the second connection portion 27 by mating the plug portion into the socket portion.

In order to configure the motor drive device 1 by using the such configured short bar unit 20, for example, the first short bar 21 is fixed to the terminal block 6 of the inverter 3, and the second short bar 22 is fixed to the terminal block 5 of the converter 2. And, as shown in FIG. 11, the converter 2 to which the second short bar 22 is fixed is installed in the installation portion of the motor drive device 1 at first, and then, the inverter 3 to which the first short bar 21 is fixed is slid from the front surface side of the terminal block 5 toward the rear side.

By this, the plug portions of the first short bar 21 can be fit in the socket portions of the second short bar 22, and the first connection portion 26 and the second connection portion 27 can electrically and mechanically be connected with each other.

On the other hand, at the time of replacing the inverter 3, by moving the inverter 3 only toward the front side in a state where the converter 2 is installed in the installation portion, the plug portions and the socket portions can be disconnected and the inverter 3 can be removed from the installation portion.

With this configuration, at the time of replacing the inverter 3, it is not necessary to remove the short bars 21, 22 from the inverter 3 and the converter 2, which is advantageous for easily replacing the inverter 3 in a shorter period of time.

Figure 13:
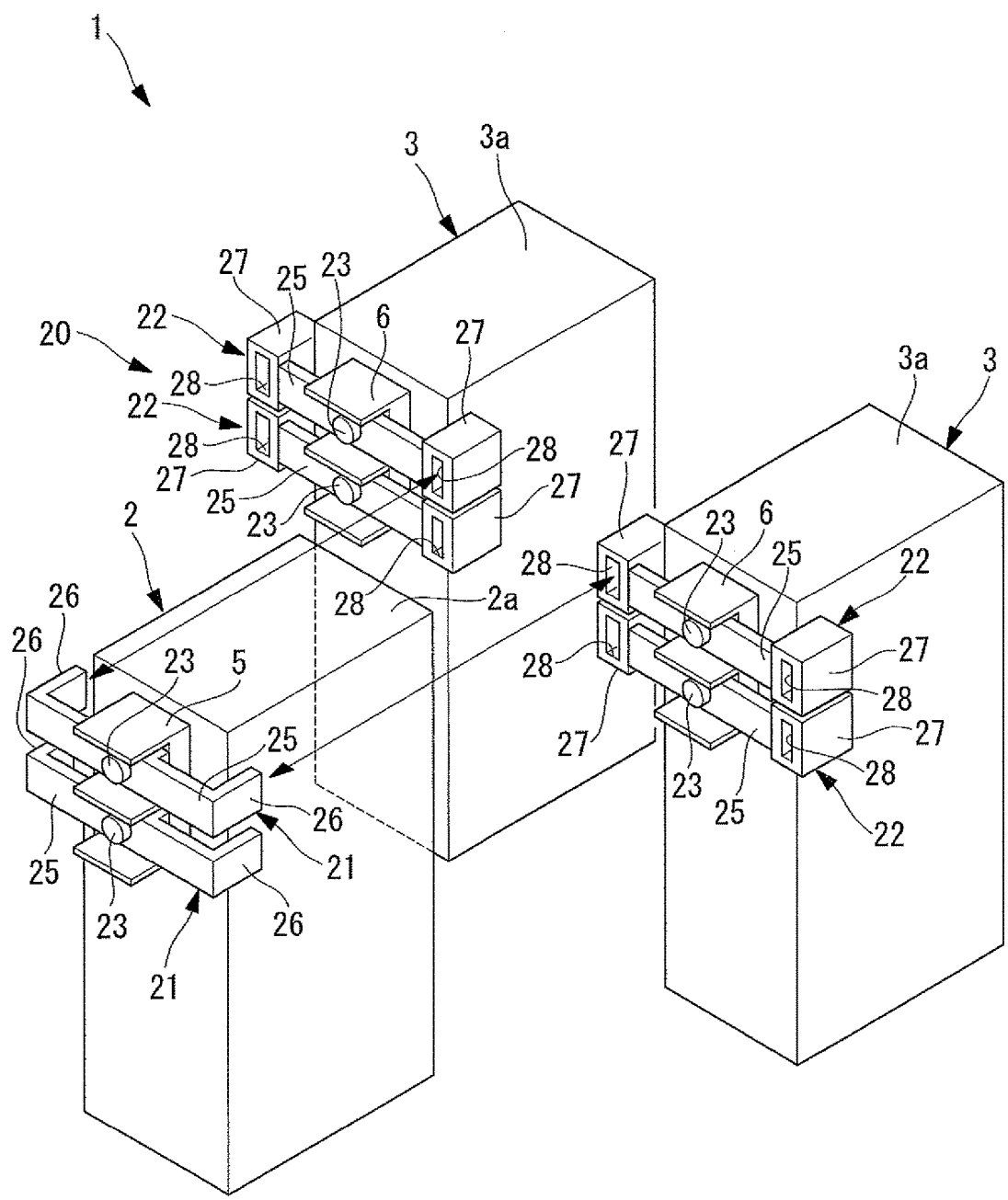
FIG. 13 is a perspective view illustrating a state where the converter is moved toward a front side relative to the inverter of the motor drive device of FIG. 12.

Also, as shown in FIG. 13, the first short bars 21 may be fixed to the converter 2, and the second short bars 22 may be fixed to the inverter 3.

At this time, it is necessary to remove the converter 2 from the installation portion temporarily when replacing the inverter 3, however, even in this case, it is not necessary to remove the first short bars 21 or the second short bars 22 from the converter 2 or the inverter 3, which is advantageous for easily replacing the inverter 3 in a shorter period of time.

Figure 12:
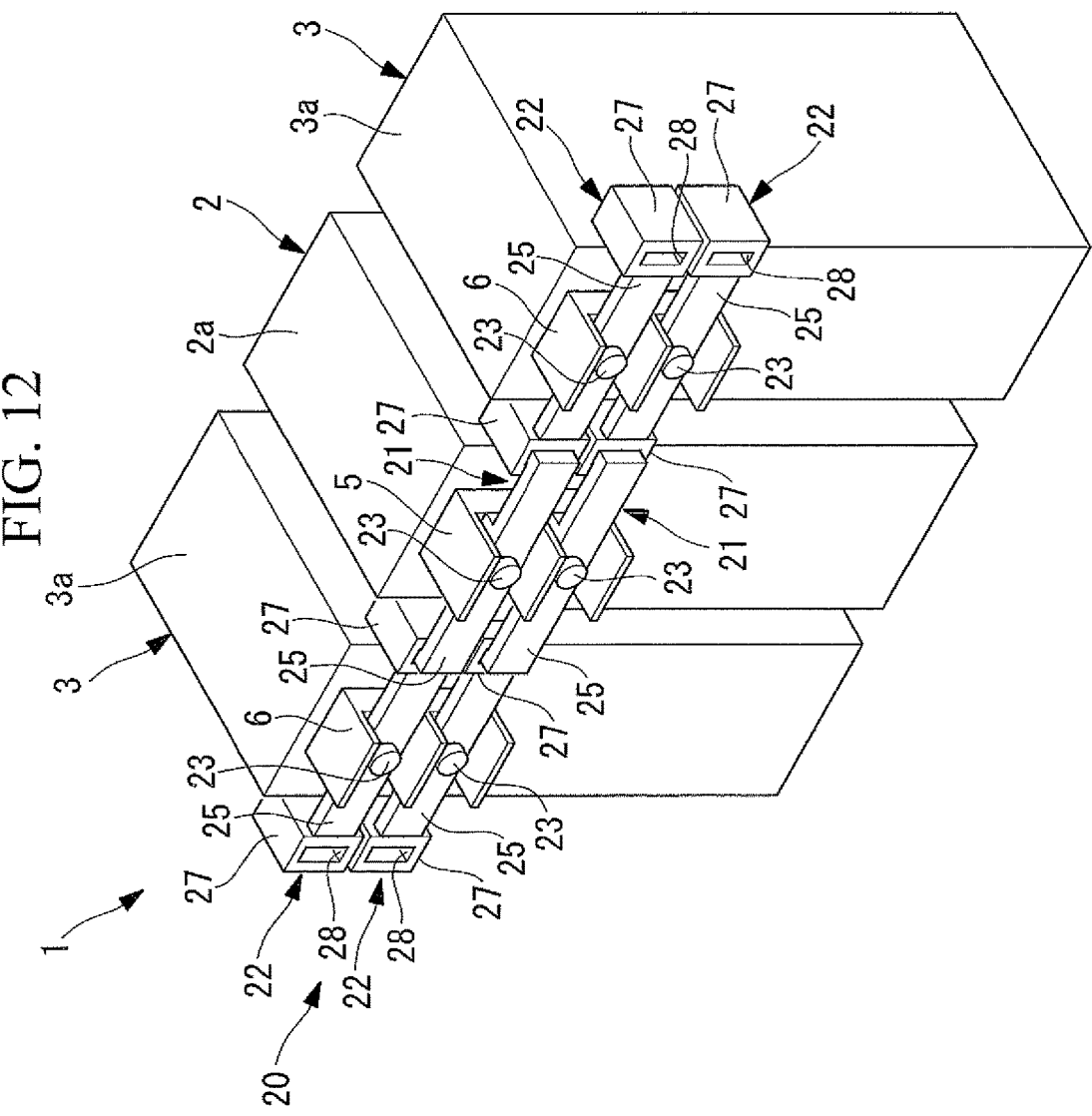
FIG. 12 is a perspective view illustrating the motor drive device of FIG. 10 in which both ends of the single converter is connected to two inverters.

Moreover, in this embodiment, the first short bars 21 and the second short bars 22 having the first connection portions 26 or the second connection portions 27 placed at the both ends of the fixed portions 25 are illustrated. In another configuration, the first and second short bars 21, 22 having the first connection portions 26 or the second connection portions 27 placed at either one of the ends of the fixed portion 25 may be employed. For example, as shown in FIGS. 12 and 13, with an example in which the both ends of the single converter 2 are connected with the two inverters 3, a first short bar 21 having the first connection portions 26 at the both ends thereof may be employed as the first short bars 21 which are attached to the converter 2, and a second short bar 22 having the second connection portion 27 at the side of the second converter 2 may be employed as the second short bars 22.

Further, in this embodiment, the converter 2 and the inverter 3 are illustrated as the motor driving unit, however, this invention may be employed in the motor drive device 1 having other motor driving units.

The inventors have arrived at the following aspects of the present invention.

An aspect of the present invention provides a short bar for connecting terminal blocks of two motor driving units which drive a motor, the shot bar comprising: a strip-plate-like fixed portion which has a through hole into which a screw for fixing is inserted and which is fixed to the terminal block of the motor driving unit with the screw; a first connection portion which is provided on an end of the fixed portion; and a second connection portion which is provided on the other end of the fixed portion, wherein the first connection portion has a configuration that the first connection portion and the second connection portion of another short bar can be connected electrically and mechanically with each other through a relative movement in a thickness direction of the fixed portion.

According to the present embodiment, by inserting the screw into the through-hole provided in the fixed portion of the short bar, and relatively moving the two motor driving units having the terminal blocks to which the short bars are fixed in the thickness direction of the fixed portion, the first connection portion of the short bar fixed to the terminal block of the motor driving units and the second connection portion of the short bar fixed to the terminal block of the other motor driving unit are relatively moved in the thickness direction of the fixed portion, which is capable of connecting the two short bars electrically and mechanically. Also, in order to disconnect the mutually connected two short bars, one of the motor driving units is moved in the thickness direction of the fixed portion relative to the other motor driving unit. By this, the first connection portion of the short bar fixed to the terminal block of one of the motor driving units and the second connection portion of the short bar fixed to the terminal block of the other motor driving unit can be disconnected from each other by the relative movement in the thickness direction of the fixed portion.

Thus, with the short bars according to the present embodiment, the short bars can be connected and disconnected simply by the relative movement of the two motor driving units without removing the screws which are fixed to the terminal blocks. Therefore, in comparison with conventional short bars which are completely removed from the two motor driving units by means of loosening the screws in order to replace a motor driving unit, the short bar of the present embodiment is capable of largely improving work efficiency of removing the motor driving units.

In the above aspect, the first connection portion and the second connection portion may have a configuration in which the first and the second connection portions can be connected electrically and mechanically with each other by the relative movement in any direction along the thickness direction of the fixed portion.

With the above-mentioned configuration, the first connection portion and the second connection portion can be connected or disconnected from each other regardless of the relative movement direction along the thickness direction of the fixed portion. That is to say, when the thickness direction is the front-and-rear direction, one of the motor driving units can be moved toward a front side relative to the other motor driving unit in order to replace the motor driving unit, and also the other motor driving unit can be moved toward the front side relative to the motor driving unit in order to replace the other motor driving unit.

Further, another aspect of the present invention provides a short bar unit for connecting terminal blocks of two motor driving units which drive a motor, the shot bar unit comprising: a first short bar fixed to the terminal block of one of the motor driving units; and a second short bar fixed to the terminal block of the other motor driving units, wherein the first short bar and the second short bar respectively include a strip-plate-like fixed portion which has a through-hole into which a screw for fixing is inserted in a thickness direction and which is fixed to the terminal block by the screw, the first short bar includes a first connection portion which is provided on at least one end of the fixed portion, the second short bar includes a second connection portion which is provided on at least one end of the fixed portion, and which has a configuration that the second connection portion can be connected with the first connection portion electrically and mechanically through a relative movement in the thickness direction of the fixed portion relative to the first connection portion.

According to the present embodiment, the screw is inserted into the through hole provided in the fixed portion of the first short bar so as to fix the first short bar to the terminal block of one of the motor driving units, and the screw is inserted into the through hole provided in the fixed portion of the second short bar so as to fix the second short bar to the terminal block of the other motor driving unit. At this state, by the relative movement of the two motor driving units in the thickness direction of the fixed portion, the first connection portion of the first short bar and the second connection portion of the second short bar can electrically and mechanically be connected. In addition, in order to disconnect the first connection portion of the first short bar from the second connection portion of the second short bar, which are connected with each other, one of the motor driving units is moved in the thickness direction of the fixed portion relative to the other motor driving unit. By this, the first connection portion of the first short bar and the second connection portion of the second short bar are relatively moved in the thickness direction of the fixed portion so that they can be disconnected from each other.

With the above-mentioned embodiment, the first short bar may have the first connection portion at the both ends of the fixed portion, and the second short bar may have the second connection portion at the both ends of the fixed portion.

With this configuration, the first short bar and the second short bar can easily be attached to the motor driving units respectively without considering the attachment direction thereof.

Also, another aspect of the present invention provides a motor drive device having the two motor driving units for driving the motor, and one of the above described short bars which are fixed to the terminal blocks of the motor driving units respectively.

Moreover, another aspect of the present invention provides a motor drive device having the two motor driving units for driving the motor, and one of the above described short bar units, wherein the first short bar is fixed to the terminal block of one of the motor driving units, and the second short bar is fixed to the terminal block of the other motor driving unit.

According to the aforementioned aspects, it is possible to improve work efficiency when replacing the motor driving unit.

REFERENCE SIGNS LIST 1 motor drive device
2 converter (first motor driving unit)
3 inverter (second motor driving unit)
4 short bar
5, 6 terminal block
7, 24 through hole
8, 55 fixed portion
9, 14, 26 first connection portion
10, 15, 27 second connection portion
11, 23 screw
20 short bar unit
21 first short bar
22 second short bar

The invention claimed is:

1. A short bar for connecting terminal blocks of two motor driving units which drive a motor, the short bar comprising:
   a strip-plate-like fixed portion which has a through hole into which a screw for fixing is inserted and which is fixed to the terminal block of the motor driving unit with the screw;
   a first connection portion which is provided on an end of the fixed portion;
   a second connection portion which is provided on the other end of the fixed portion; and
   wherein the first connection portion has a configuration that the first connection portion and the second connection portion of another short bar can be connected electrically and mechanically with each other through a relative movement in a thickness direction of the fixed portion.

2. The short bar according to claim 1, wherein the short bar has a configuration in which the first connection portion and the second connection portion can be connected electrically and mechanically with each other through the relative movement in any direction along the thickness direction of the fixed portion.

3. A motor drive device comprising:
   the two motor driving units for driving the motor according to claim 1; and
   the short bar according to claim 1 which is fixed to each of the terminal blocks of the motor driving units.

4. A short bar unit for connecting terminal blocks of two motor driving units which drive a motor, the short bar unit comprising:
   a first short bar fixed to the terminal block of one of the motor driving units;
   a second short bar fixed to the terminal block of the other motor driving units;
   wherein the first short bar and the second short bar respectively include a strip-plate-like fixed portion which has a through hole into which a screw for fixing is inserted in a thickness direction and which is fixed to the terminal block by the screw;
   wherein the first short bar includes a first connection portion which is provided on at least one end of the fixed portion; and
   wherein the second short bar includes a second connection portion which is provided on at least one end of the fixed portion, and which has a configuration that the second connection portion can be connected with the first connection portion electrically and mechanically through a relative movement in the thickness direction of the fixed portion relative to the first connection portion.

5. The short bar unit according to claim 4, wherein:
   the first short bar includes the first connection portions at the both ends of the fixed portion; and
   the second short bar includes the second connection portions at the both ends of the fixed portion.

6. A motor drive device comprising:
   the two motor driving units for driving the motor according to claim 4;
   the short bar unit according to claim 3;
   wherein the first short bar is fixed to the terminal block of one of the motor driving units; and
   wherein the second short bar is fixed to the terminal block of the other of the motor driving units.

* * * * *